United States Patent [19]

Linnemeier et al.

[11] 4,304,147
[45] Dec. 8, 1981

[54] STEERING COLUMN

[75] Inventors: Elmer H. Linnemeier, Washington Depot; Robert P. Benson, Northfield, both of Conn.

[73] Assignee: The Torrington Company, Torrington, Conn.

[21] Appl. No.: 114,602

[22] Filed: Jan. 23, 1980

[51] Int. Cl.³ .............................................. B62D 1/18
[52] U.S. Cl. ...................................... 74/492; 29/508; 188/371
[58] Field of Search ................. 74/492, 493; 188/1 C; 403/277, 285; 293/133; 29/508

[56] References Cited

U.S. PATENT DOCUMENTS

| 3,130,443 | 4/1964 | Tonelli | 403/285 X |
| 3,308,908 | 3/1967 | Bunn | 188/1 C |
| 3,508,633 | 4/1970 | Nishimura et al. | 188/1 C |
| 3,621,732 | 11/1971 | Kaniut | 74/492 |
| 3,760,650 | 9/1973 | Pardy | 74/492 |
| 3,805,636 | 4/1974 | Howes | 74/492 |

*Primary Examiner*—Allan D. Hermann
*Attorney, Agent, or Firm*—Frank S. Troidl

[57] ABSTRACT

A steering column for a steering wheel assembly for a motor vehicle has an outer tube with a shorter inner tube in contact with the inner periphery of the outer tube to provide a steering column having a longitudinal portion thicker than the rest of the steering column.

The inner tube is inserted into the outer tube and that portion of the outer tube which surrounds the inner tube is mechanically reduced in diameter to fit against the inner tube.

1 Claim, 3 Drawing Figures

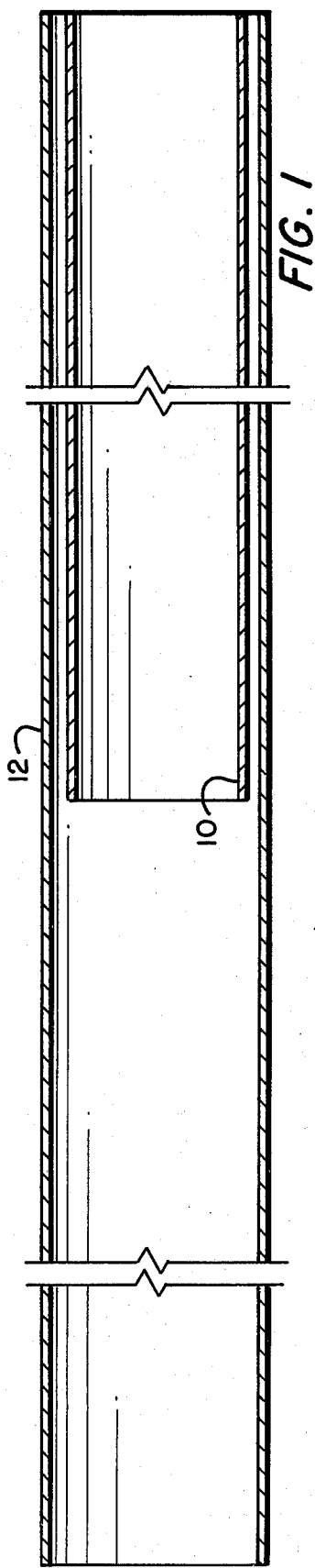
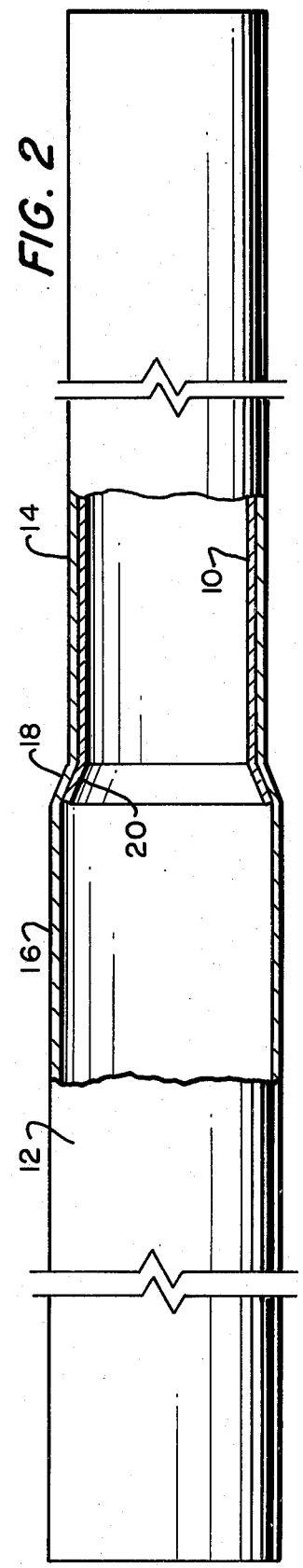
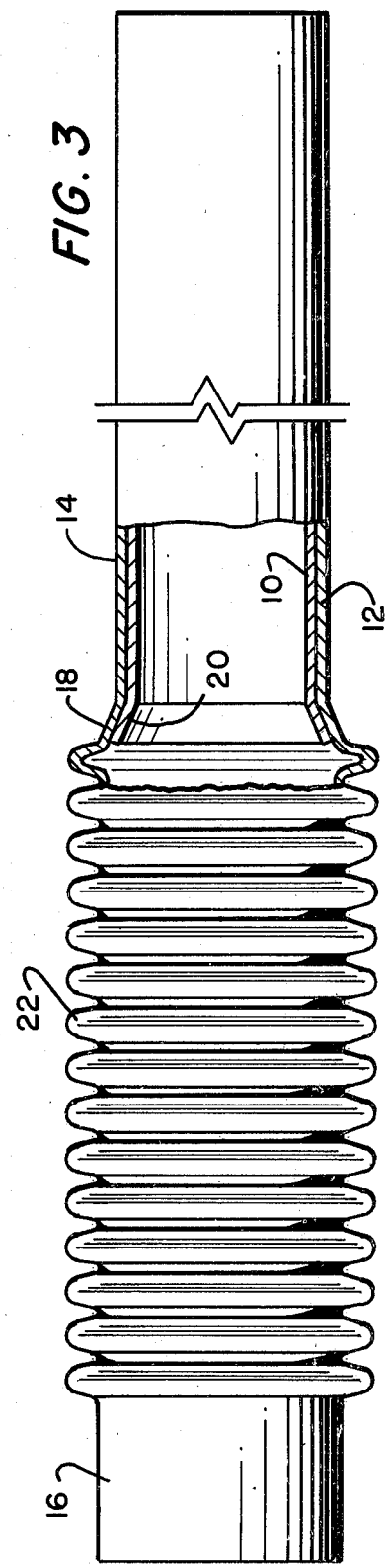

STEERING COLUMN

This invention relates to steering mechanisms for motor vehicles. More particularly, this invention is a new steering column for a steering wheel and a new method of making the steering column.

When an accident involving a motor vehicle occurs, people in the vehicle, especially the driver, suffer injuries often leading to death. Often greater injuries or death occurs to the driver because of the great shock given to him by projecting portions of the steering wheel. The automotive industry is continuously working to improve safety devices in automobiles including improved steering wheels designed to minimize the shock resulting from collisions.

Some existing structures for automotive energy absorbing steering wheels require the upper section to be substantially thicker than the lower section. The upper section must be strong enough to support the steering wheel in the vehicle and the lower section must be of thinner material so that it can be formed into convolutions that will collapse in the event of an automotive accident. The existing methods of making a tube with one section having a heavy wall and the other section having a thinner wall is to take two tubes, each the desired wall thickness, and form one end of one tube to slip inside the other tube and then weld them together. This method and the resulting steering column has several disadvantages including the fact that there are welds which are subject to failure and there is an area in the steering column where both tubes are together which increases the length of transition between the two wall thicknesses of the tube.

This invention is a non-welded steering column with the upper end of the steering column having a heavier wall thickness than the lower end of the steering column. The convolutions are formed on the lower end of the steering column.

Briefly described, the new steering column includes an outer tube and an inner tube. The inner tube is shorter than the outer tube and its outer periphery is in contact with the inner periphery of the outer tube to provide a steering column having a longitudinal portion of greater thickness than the rest of the steering column.

The steering column is constructed by taking a tube for the thinner wall having the thickness needed to produce a collapse of the convolutions in the event of a vehicle accident. The length of the thinner wall tube is that length needed to make the full length steering column. Another tube is inserted into the first tube. The second tube has the length needed for the heavier wall. Mechanical means forces the outer tube into contact with the inner tube to produce the upper section of reduced diameter. Such mechanical means may include rotary swaging or drawing both tubes through a die. The reduced upper section now functions like a tube of a wall thickness equal to the added thicknesses of the two tubes used.

Some of the many advantages of this new invention are: (1) a one piece no-weld structure is provided (2) a column cannot break or bend because of weld failure (3) the thicker section cannot collapse into the convolutions thinner section (4) the completed steering column is essentially a column with two different wall thickness as one unit (5) the transition between the two wall thicknesses is minimal.

The invention, as well as its many advantages, may be further understood by reference to the following detailed description and drawings in which:

FIG. 1 is a longitudinal sectional view useful in explaining the method of forming the new steering column;

FIG. 2 is a longitudinal sectional view of the new steering column after the smaller tube is inserted into the larger tube and a portion of the outer tube has been reduced in diameter against the inner tube; and FIG. 3 is a longitudinal sectional view showing the steering column after the convolutions have been formed in the outside tube.

In the various figures, like parts are referred to by like numbers.

Referring to the drawings, and more particularly to FIG. 1, an inner tube 10 is shown inserted into one end of an outer tube 12. The inner tube is shorter than the outside tube and has the length desired for the completed upper section of greater thickness than the rest of the steering column. The thickness of the outer tube 12 is the thickness desired to provide collapse at a predetermined load or shock on the steering column of convolutions which are subsequently formed on the lower section of the steering column. In FIG. 1, the tubes 10 and 12 are shown as having the same thickness but, if desired, the two tubes may have different thicknesses, it being necessary, however, that the thickness of the outer tube 12 be the proper thickness for the convolutions and the combined thickness of the two tubes be such that they provide the required greater thickness section in the completed steering column.

FIG. 2 shows the steering column after a portion of the outer tube 12 has been reduced in diameter so that the portion of reduced diameter has its entire inside periphery reduced against the entire outside periphery of the inner tube 10. The diameter may be reduced by suitable mechanical means such as rotary swinging or by drawing both tubes through a die.

It can be seen from FIG. 2 that the diameter of the longitudinal portion 14 of the outer tube is less than the diameter of the longitudinal portion 16 of the outer tube. An integral tapering portion 18 interconnects the larger diameter portion 16 and the smaller diameter portion 14. The inner tube 10 has an integral portion 20 at its inner end. The integral tapering portion 20 is in contact with the outer tube tapering portion 18.

FIG. 3 shows the steering column after the convolutions have been formed in the lower greater diameter section. The convolutions 22 are formed along a major portion of the larger diameter section 16 of the outer tube.

It can be seen that this new steering column and method for making a steering column provides the automotive industry with an improved steering column which, among other things, provides a one piece no-weld structure, cannot break or bend because of weld failure, the upper section cannot collapse into the convolutions section and the transition between the two wall thicknesses is minimal.

We claim:

1. A steering column for a steering wheel assembly for a motor vehicle comprising: an outer tube having a longitudinal portion of larger diameter and a longitudinal portion of smaller diameter interconnected by a tapering portion; an inner tube extending into the smaller diameter longitudinal portion of the outer tube up to the longitudinal portion of the outer tube of larger diameter; the inner tube having a tapering portion at one end contacting the tapering portion of the outer tube and the rest of the inner tube extending into the outer tube contacting the outer tube thereby providing a steering column having a longitudinal portion of greater thickness than the rest of the steering column, said larger diameter portion of the outer tube having convolutions.

* * * * *